INVENTER
JEAN-ROBERT HUETIGER

BY Richard C. Steinmetz Jr.

ATTORNEY

Oct. 22, 1968 JEAN-ROBERT HUETIGER 3,407,270

COMMUNICATION SYSTEM AND SYSTEM TO INDICATE SIGNALS THEREFROM IN FINITE TERMS

Filed Nov. 23, 1964 3 Sheets-Sheet 2

INVENTOR
JEAN-ROBERT HUETIGER

BY Richard C. Steinmetz Jr.

ATTORNEY

Oct. 22, 1968 JEAN-ROBERT HUETIGER 3,407,270

COMMUNICATION SYSTEM AND SYSTEM TO INDICATE SIGNALS THEREFROM IN FINITE TERMS

Filed Nov. 23, 1964 3 Sheets-Sheet 3

INVENTOR
JEAN-ROBERT HUETIGER

BY Richard C. Steinmetz Jr.

ATTORNEY

United States Patent Office 3,407,270

Patented Oct. 22, 1968

3,407,270

COMMUNICATION SYSTEM AND SYSTEM TO INDICATE SIGNALS THEREFROM IN FINITE TERMS

Jean-Robert Huetiger, Milwaukee, Wis., assignor to Allen-Bradley Company, Milwaukee, Wis., a corporation of Wisconsin Filed Nov. 23, 1964, Ser. No. 413,090
5 Claims. (Cl. 179—18)

ABSTRACT OF THE DISCLOSURE

In a communication or telephone system, signals originating with a signal sending unit in the system can be translated into finite terms so as to convey information to a person. Of particular interest is a telephone system whereby predetermined dialing at any phone will connect that phone with translation or indicating means to convert subsequently dialed signals into finite terms.

This invention relates to a system whereby groups of signals, e.g. grouped pulses resulting from each rotation of a dial telephone, can be separated into their respective groups and thereafter stored and/or made available in functional finite terms.

It was the desire for a system which would make available the location of particular persons within a sizable company area which started the work resulting in the invention herein. Since a telephone system was to be found throughout the company area in question, the requested locator system was adapted to the existing telephone system; and hence, the illustration of the invention herein is shown in combination with a telephone system. However, the basic invention and the system are readily adaptable to other telephone-type and communication systems. As will be expanded upon below, features of the existing telephone system are used to control the invention.

The basic operation of the system requires that each individual who is to use the system be assigned his own code number of two (2) digits. Thus, when this individual is to indicate his particular location, he picks up the phone and dials a first number which connects his phone with the locating system; then the two (2) digits which represent the code assigned to him followed by any number of digits which correspond to a locator code, e.g. the extension number from which he is dialing. These final numbers are indicated at one or more points, e.g. on readout drums on a panel near the operator.

One object of this invention is to provide a system which will receive and sort grouped signals for storing and/or subsequent indication as usable information.

Another object of this invention is to provide a system adaptable to a telephone-type or communication system whereby grouped signals from the latter system can be received and sorted for storage and/or subsequent indication of the signals.

Another object of this invention is to provide a system adaptable to a telephone-type or communication system so as to record dialed numbers on readout devices.

Another object of this invention is to provide a simple and yet efficient system for receiving, sorting, storing and/or subsequent dissemination of information utilizing shift registers in a unique manner.

A still further object of this invention is to provide a shift-module system for a shift register requiring a particular operating sequence, which module consists of a minimum number of components to provide the most effective operation.

The above as well as other objects of this invention will become more apparent with the following detailed description of a specific embodiment.

Figures 1, 2:
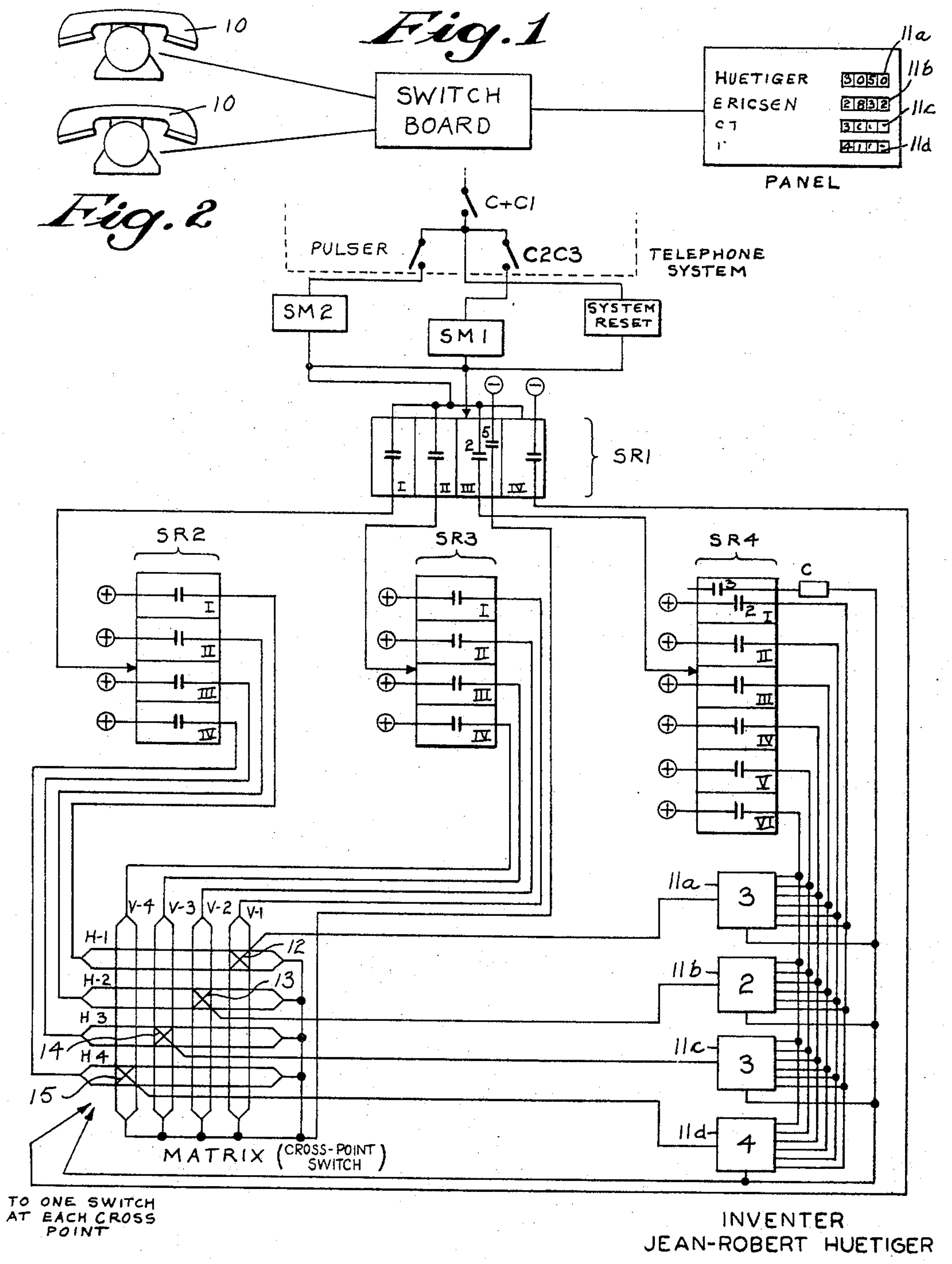
FIGURE 1 shows the basic invention comprising a telephone system with its telephone and switchboard plus the added panel on which digital indicator means are found opposite a list of names.
FIGURE 2 is a block diagram of the Panel portion of the invention shown in combination with critical control elements of the Telephone System.
Figure 3A:
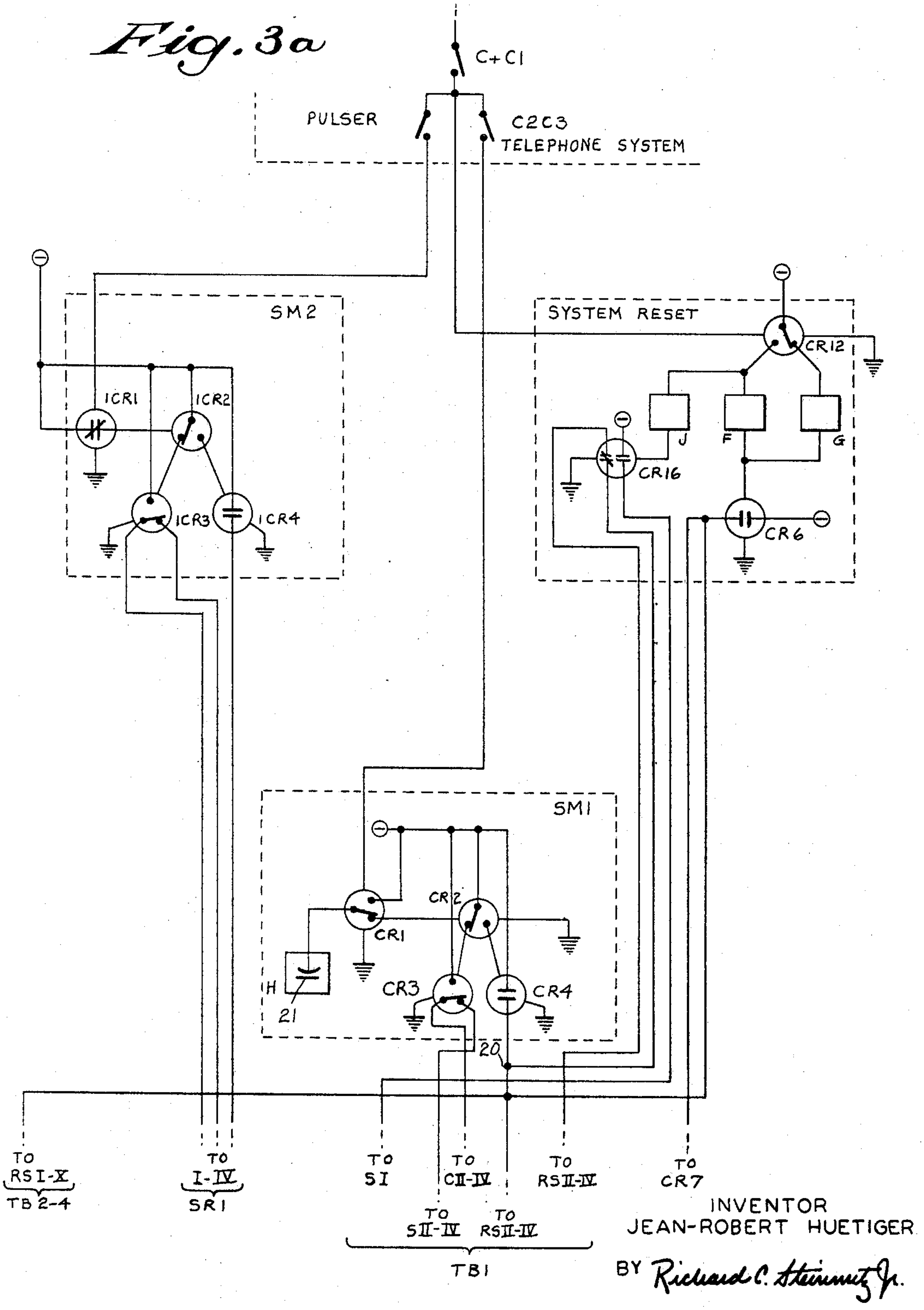

FIGURE 3*a* is a more detailed circuit diagram taken from the upper portion of FIGURE 2, viz. shift modules I and II plus a System Reset.

Figure 3B:
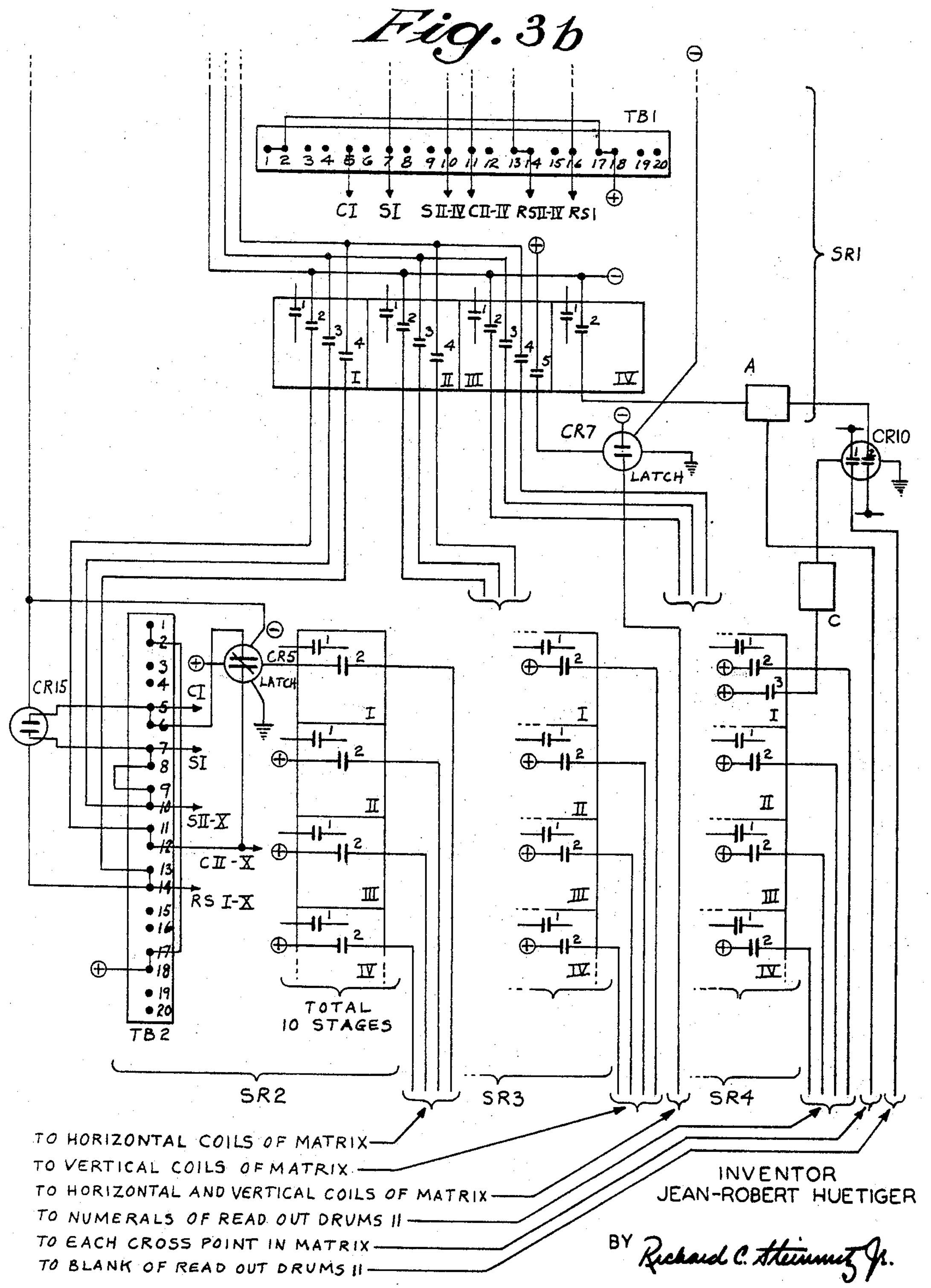

FIGURE 3*b* is a more detailed circuit diagram of Shift Registers 1–4 as shown in FIGURE 2.

It will be understood that the following description of a specific embodiment incorporating a dial telephone system as set forth in the drawings is included herein for purposes of explanation only; and that the scope of the invention is to be found in the appended claims.

The basic system can be shown by describing FIGURES 1 and 2. The telephones 10, and the Switchboard represent a standard telephone system in which pulses are generated by the return of the telephone dial corresponding to the number dialed. The Panel or indicating means connected to the switchboard includes sets of readout drums 11*a*, 11*b*, 11*c*, and 11*d*, each set corresponding to a name on the Panel. Of course, it will be remembered that the particular number of readout drums in each set, the number of sets and the purpose for which each set is intended is a variable within the discretion of the user.

A block circuit-diagram of the Panel shown in FIGURE 1 is set forth in FIGURE 2. Here, the corresponding readout drums, 11, illustrated by just one drum per set, are to be found in the lower right-hand corner of the figure. The only portion of FIGURE 2 which is not within the Panel of FIGURE 1, is in the extreme upper portion of the system designated as the Telephone System. The switch designated C+C1 is any switch of the Telephone System which will permit entry into the Panel. For example, this switch C+C1 may close with the dialing of a particular number on any telephone in the Telephone System. In fact, this use of the telephone dial has been incorporated into the reduction to practice through the dialing of the number 5.

Since the system is to accommodate groups of signals, e.g. pulses, the switch C2C3 is a switch which will respond to each of these groups. Each group of pulses represents a rotation of the dial or a dialed number and switch C2C3 has been selected so as to close when the telephone dial begins its return to a normal or at-rest position and will open after this dial has reached its normal position.

Finally, the Pulser opens and closes with each pulse and in this case opens and closes as the telephone dial returns to its normal position. It should be noted that while switch C2C3 and the Pulser may open or close with each rotation of the telephone dial, it is necessary that switch C+C1 must first be closed before switch C2C3 and the Pulser will affect the Panel. This relationship has been shown schematically by FIGURE 2.

The switch C+C1 remains closed until the information dialed has been indicated on the Panel, e.g. switch C+C1 may open when the receiver of the telephone is replaced. Subsequent clearing of the pulse information retained by the system of the Panel, other than the reset drums 11, can occur simultaneously with the opening of C+C1. This is accomplished by the block entitled System Reset in FIGURE 2, found in series with the switch C+C1 and serves a substitute for Shift Module 1 (SM1), and Shift Module 2 (SM2) which normally control the shifting of stages within the Shift Registers, SR1–4. This substitution is illustratively shown in FIGURE 2 by connecting the System Reset in parallel with SM1 and SM2.

Considering the basic components of the Panel as shown in FIGURE 2, it will be readily seen that a first shift register, SR1, is being used to control a group of parallel shift registers, SR2–4. Before going further it must be noted that the particular number of shift registers, as well as the number of stages therein (each stage being indicated herein by a Roman numeral) is a matter which remains with the user. However, there is some limitation since at least one stage in SR1 controls a respective parallel shift register. In the actual reduction to practice, six (6) parallel shift registers were used, each incorporating ten (10) stages; and, therefore, seven (7) stages were utilized in SR1. The reason for this particular number of registers and stages will become apparent as the description continues.

As is well known in the art, these shift registers serve to shift a signal from one stage to the next. The method for shifting used in the illustrated embodiment utilizes shift modules designated SM1 for SR1 and SM2 for SR2–4. The necessary connections for one particular type of control and shift register are set forth in more detail in FIGURES 3*a* and 3*b*; so for purposes of illustration in FIGURE 2, these control connections have been indicated merely by arrowheads adjacent each shift register. Thus, the shift control afforded by the shift modules SM1 and 2 dictates whether one of two possible conditions will exist in the separately controlled switch within each stage. These two possible conditions may be for example, open or closed contacts or positive and negative states of polarity. A switch is illustrated in FIGURE 2 by parallel lines perpendicular to the connecting circuit to be designated as Normally-Open contact symbols. Note that the invention is not limited to particular types of switches.

One significant contribution of this invention is the use of one (1) shift register to control a number of shift registers. Specifically, SM1 controls SR1 while the control for SR2–4 becomes the controlled in SR1. In other words, only that stage in SR1 which has a closed switch will permit the controlling function of SM2 to be conveyed to the corresponding parallel shift register.

Combining this last-mentioned shift register configuration with the Telephone System as shown in FIGURE 2, each group of pulses will pass through a separate stage of SR1 since switch C2C3, which controls SM1, will open after one of the shift registers SR2–4 has received each group of pulses, i.e. after each return of the telephone dial to its normal position. This opening of switch C2C3 will shift the closed stage in SR1 by means of SM1. While switch C2C3 remains closed, the Pulser sends pulses to a parallel register SR2–4 which is connected to a closed stage of SR1, while SM2 shifts the particular register SR2–4 connected hereto with each pulse of the pulse group.

In order to select a particular set of readout drums 11, a Cross-Point Switch is used in combination with SR2 and SR3. This Cross-Point Switch, as is well known in the art, uses "and" logic principles by selecting that point at which two (2) energized coils cross. Here, each stage of SR2, originating from a positive source, is connected to a corresponding horizontal coil in the Cross-Point Switch, e.g. stage I is connected to horizontal coil H–1. Likewise, each stage of SR3 is connected to a corresponding vertical coil of the Cross-Point Switch, e.g. stage I is connected to vertical coil V–1. Therefore, should stages IV of SR2 and IV of SR3 be closed, the cross-point at which H–4 and V–4 cross (designated as 15) will be the only closed switch in the Cross-Point Switch. As is seen from the drawing, the switch within each cross-point is connected to a set of readout drums 11, e.g. point 12 to 11*a*; point 13 to 11*b*; point 14 to 11*c* and point 15 to 11*d*. However, before any cross-point on the Cross-Point Switch will close, it is necessary to complete a circuit to the coils. This is accomplished by the closing of the switch 5 in stage III of SR, which provides the negative source to each of the coils.

The remaining shift register, illustrated herein by SR4, connects a positive source to a corresponding readout drum 11 in each set thereof. The particular readout drums 11 which are shown in FIGURE 2 are exemplified by the Magneline indicators manufactured by Patwin Electronics of Waterbury, Connecticut and consist of individual coils for each number to be indicated plus rotatable, magnetically responsive means which line up with the particular coil deenergized. Therefore, if stage IV of SR4 were a closed stage, one coil in each readout drum 11 of each set thereof corresponding to a preselected member to be indicated would be connected to this positive source. The negative source—necessary to complete the circuit to the readout drum 11—is supplied by the closing of stage IV of SR1 via the already selected crosspoint of the Cross-Point Switch; so that if stages IV of SR2 and SR3 were closed, the cross-point indicated as 15 would be closed to complete the circuit to the numeral 4 selected by stage IV of SH4, but only on the readout drum corresponding to cross-point 15, i.e. readout drum 11*d* as shown in FIGURE 2. This final selection of a set of readout drums is accomplished by connecting the stage IV negative source of SR1 to each of the switches which make up a cross-point in the Cross-Point Switch. By means of a latching feature, the drums 11 remain in the selected position until another coil therein is energized.

Also connected to a separate switch 3 in stage I of SR4 is a Timer C. This serves to illustrate a system by which members already indicated on the readout drums can be erased without repeating the complete dialing required to put numbers on the readout drums. The Timer C is of an on-delay type which prevents closing of the circuit therethrough for a preselected period of time. This circuit passing through Timer C connects blank spaces on each of the readout drums so that when a selected set of readout drums has a completed circuit from Timer C passing thereto, a blank rather than a number will be indicated on the face of the readout drum 11. This end is achieved by selecting a cross-point in the Cross-Point Switch in the same manner as described above and then closing only stage I of SR4. During normal pulsing, a pulse would be shifted through stage I of SR4 and the stage would be left open before Timer C could close the circuit. Hence, the blank spacing on the readout drum 11 would not appear.

Use of this above described eraser system for the readout drums 11 requires two prerequisites. First, the code to be used for the readout drums cannot include the numeral 1 in those readout drums 11 controlled by SR4. Secondly, the control for shifting SR4 must provide that stage I of SR4 will not close when the final stage of SR4 has been selected. This latter control will be considered in more detail in the description of FIGURES 3*a* and 3*b*.

The operation of the system described to this point would begin with the dialing of a particular number on any telephone within the Telephone System so as to close switch C+C1. As will be described later in connection with FIGURES 3*a* and 3*b*, this closing of switch C+C1 will cause each of the shift registers to be reset, i.e. open the switches within each stage, but at the same time close stage I of SR1. Next, the individual who is dialing must dial his code consisting of two numbers in order that the system may select the correct set of readout drums 11. By dialing the first of these two numbers, switch C2C3 of the Telephone System closes and the Pulser conveys those pulses corresponding to the telephone dial return, through stage I of SR1 to SR2—the stages of SR2 being shifted by SM2 with each pulse.

When the telephone dial returns to its normal position after the individual has dialed the first of the two (2) numbers which identify him, the switch C2C3 opens and SM1 shifts SR1 to stage II. The dialing process is once again repeated with SR3 this time receiving the dialed pulses. Thereafter switch C2C3 opens again and SM1 shifts SR1 to stage III, thus closing switch 5 therein to supply the negative source for the Cross-Point Switch. As has been described above, the particular stages which are at this time closed in SR2 and SR3 select a particular cross-point in the Cross-Point Switch which is connected to the desired set of readout drums 11. Additional dialing is for the purpose of selecting numbers on the now designated set of readout drums 11. FIGURE 2 indicates only one such number responding to SR4, the latter being shifted in the same manner as SR2 and SR3. When the designated coil of readout drum 11 has been selected by the corresponding closed stage of SR4, SM1 shifts SR1 to the final stage, e.g. stage IV, which in turn closes the negative source for the readout drums 11 so as to complete the circuit thereto via the switches of the Cross-Point Switches.

Readout drums other than those depicted by FIGURE 2 may also be used, e.g., those readout drums which respond to pulse so as to count the pulses and thereby read out the additive number. To use such readout drums would eliminate the need for SR4 and its equivalent; but the same selection system for the proper readout drum set would still be employed.

The FIGURES 3*a* and 3*b* illustrate the details of circuitry or translation means which are mainly used for the shift registers and control thereof found in FIGURE 2. The particular shift registers shown diagrammatically are known in the art as, for example, the Allen-Bradley shift register, Bulletin 1650, described in the Allen-Bradley Bulletin Price Sheet 1650, dated Aug. 1, 1962. Each shift register consists of stages indicated by a Roman numeral in which switches, e.g. hermetically sealed dry reed switches, are surrounded by a set and reset coil in relay fashion. Adjacent each reed switch is an inductive material, e.g. ferrite, which performs a latching function when the set coil is energized and an unlatching function when the reset coil is energized, as is well known in the art. The symbolism used to indicate each of the switches within a stage consists of two parallel lines perpendicular to the connecting wire with each switch being given an independent number. The switch No. 1 in each stage has an integral function in the shift register operation and, therefore, can serve no external purpose.

In order that there be no misunderstanding as to symbolism used in FIGURES 3*a* and 3*b*, it should be noted that the relays have been indicated by circles which represent the energizing coil within which the contacts or switches are shown either as parallel lines perpendicular to the connecting conduits or C-type contacts with one Normally-Open, one Normally-Closed contact and a common.

Each shift register also includes a terminal board indicated here as TB1 for SR1, etc. It should be noted that the terminal boards for SR3 and SR4 have been eliminated from FIGURE 3*b* for purposes of simplifying the drawing. However, both SR3 and SR4 would have terminal boards, correspondingly indicated as TB3 and TB4, each of which would be wired in a manner identical to TB2.

The operation of each shift register is based on a three-step sequence. The arrowheads running from each terminal board, i.e. TB1 and TB2, indicate the particular stage being controlled. Again, for purposes of simplicity, the detailed circuitry involved in connecting the terminal board with the shift register control has been eliminated and is shown only by the arrowheads since this detail is available and known, e.g. the above-mentioned Allen-Bradley Bulletin Price Sheet.

Briefly, the three-step sequence consists of a capacitor storage step in which the capacitor in the next sequential stage is charged if the preceding stage is latched closed, a reset step in which the reset coils in each stage are energized so as to unlatch those stages which are closed—thus leaving all stages in an open condition—and a set step in which those set coils which are connected to charged capacitors are energized to close that respective stage. The control for each step is indicated by the arrows leading from TB1 and TB2 with C indicating the capacitor storage step, RS indicating the reset step and S indicating the set step. The Roman numerals following each step indicator designate the particular stage thereby controlled while the terminal numbers 1 through 20 on each terminal board correspond to those used in the above mentioned Allen-Bradley Bulletin 1650 register. The connection between terminals 17–18 and 1–2 is used for operation of the particular shift register and is shown here only for completeness of the wiring to the register.

Turning to FIGURE 3*a* and describing the detail therein in combination with a dial telephone system; the control switches of the Telephone System as described in FIGURE 2, viz. switches C+C1 and C2C3 plus the Pulser, are once again shown. Switch C+C1 controls the System Reset by closing when a preselected number is first dialed so as to connect the Panel with the Telephone System and opening when the information has been dialed into the panel, e.g. when the telephone receiver is hung up. This System Reset comprises relay CR12 which responds with the closing of switch C+C1 to close the circuit to Timers F and J.

Since the purpose of the System Reset is to clear all of the information from SR1–4, i.e. energize the reset coil in each shift register stage to thereby open the contacts therein, CR6 is connected to the reset coils of each shift register, viz. RSII–IV at terminal 14 of TB1 and RSI–X at terminal 14 of TB2–4. The Timer F performs an off-delay function so as to open CR6 a predetermined time after CR12 has completed the circuit thereto.

Remembering the function of the Panel, it is evident that stage I of SR1 must be closed when the Panel is first connected to the Telephone System through C+C1 in anticipation of the pulses which must traverse stage I of SR1 before shifting of this register. In other words, permitting CR6 to reset stage I of SR1 upon the closing of switch C+C1, would not permit the pulses from the next dialed number to pass through SR1 to SR2. Therefore, stage I of SR1 is separately controlled by the System Reset through Timer J and CR16. The Normally-Open contact of CR16 is connected to the set coil of stage I in SR1 via terminal 7 of TB1. Hence, when CR12 is closed and Timer J functions in an off-delay manner, CR16 is energized to close the Normally-Open contact thereby energizing the set coil in stage I of SR1, i.e. the switches of stage I are thereby latched closed. To insure that the set coil of stage I, SR1, remains closed after the initial reset of the other stages, Timer J is set to open the circuit to CR16 after Timer F has opened the circuit to CR6. By closing CR16 before CR6 the Normally-Closed contact in the former would reset stage I, SR1.

It is apparent, however, that the set coil of stage I, SR1, will only close when the Panel is first connected to the Telephone System via switch C+C1. Moreover, the capacitor for stage I, SR1, cannot be charged as it is not connected—see terminal 5 of TB1. Therefore, stage I, SR1, will only close with the connection of the Panel to the Telephone System via C+C1 since the stage I capacitor must be charged before the stage can close and the set coil cannot function. This means that only one stage in SR1 will close at any one time and that this closed stage will be the one originally closed and subsequently shifted with the opening and closing of switch C2C3—to be described below.

CR16 also has a Normally-Closed contact which is connected to the reset control of SM1 at 20 and RSI at terminal 16 of TB1. Therefore, when CR16 is not energized, the reset coil of stage I, SR1, responds with the reset coils of the remaining stages of SR1.

The Timer G which is in parallel with Timer F and functions in the same manner, i.e. as a time-delay device, permits reset of all stages in SR1–4 including stage I, SR1, in the same manner as timer F; but this time the reset occurs with the opening of switch C+C1. Timer F then is essentially an assurance for all stages except stage I, SR1 that Timer G has performed its function when the Panel was previously disconnected from the Telephone System.

Shift Module 1, designated as SM1, responds to the opening and closing of switch C2C3 which in turn opens and closes with each rotation of the telephone dial. Closing of switch C2C3 energizes CR1 to complete the circuit to Timer H and charge capacitor 21. The opening of switch C2C3, i.e. when the dial returns to a normal position, de-energizes CR1 so as to complete the circuit between Timer H and CR2. The timing function of Timer H interrupts the discharge of capacitor 21 at a preselected point to thereby de-energize CR2.

Both CR2 and CR3 use here the C-type contacts to establish the sequence necessary for operation of the shift register. The Normally-Closed contact of CR2 is connected to the coil of CR3, the Normally-Open contact of CR2 is connected to the coil of CR4 and the common is connected to the external power source. In CR3 the Normally-Open contact (i.e. when CR3 is de-energized) is connected to the set coils in stages II–IV of SR1 via terminal 10 of TB1, while the Normally-Closed contact (i.e. when CR3 is energized) of CR3 is connected to the external power source. The common in CR3 is connected to the capacitors in stages II through IV of SR1 via terminal 11 of TB1. Finally, the Normally-Open contacts in CR4 are connected to the reset coils of stages II–IV via terminal 14 of TB1.

It must again be recalled that the required sequence for shifting each register requires (a) energization of the capacitors in the next succeeding stage when the condition of the preceding stage is closed, (*b*) energization of all reset coils so as to clear or open each stage followed by (c) energization of those set coils connected to corresponding charged capacitors to thereby shift the condition of the preceding stage. This sequence is established in SM1 by means of the Normally-Open contacts of CR2 and the Normally-Closed contacts of CR3 (which are opened under operating conditions as shown in FIGURE 3*a*); each contact being closed substantially simultaneously after energization of CR2 to thereby permit the charge of capacitors within SR1 to take place before the closing of the Normally-Open contact in CR4. Since the time to charge the capacitors of SR1 is a matter of microseconds, the proper sequence is established. It is apparent that the closing of switch C2C3 with a subsequent rotation of the telephone dial will again energize CR1 and thereby repeat the shift sequence of SM1.

The shift module used to control SR2–4 is one in the same and is designated as SM2. The construction of SM2 is basically the same as that of SM1 described above with corresponding relays being indicated by a prefix 1. Since the purpose of SM2 is to shift the corresponding shift register with each opening and closing of the Pulser, it is not necessary to use a timer and 1CR1 need only include a standard switch. The specific switch used in 1CR1 is shown as a Normally-Closed switch since SM2 is designed to shift with each opening of the Pulser, i.e., energization of 1CR2 occurs when the Pulser is open. Obviously, should it be decided to operate SM2 upon the closing of the Pulser, a Normally-Open rather than Normally-Closed contact would be used in 1CR1. Since the remaining construction of SM2 is identical to that previously described in SM1, further description of SM2 construction and operation is not considered necessary.

Turning to SR2–4, it is desired that only one pulse from each group of pulses resulting from a rotation of the telephone dial be shifted through each shift register. To accomplish this end a latched relay CR5 has been introduced into the capacitor circuit. With the energization of stage I, the Normally-Closed switch in CR5 is latched open so that subsequent signals to charge the capacitors of SR2 will not be able to reach the capacitor of stage I and the capacitor of stage I cannot be charged thereafter. Hence, the set coil of stage I in SR2 cannot be energized thereafter. To unlatch CR5 the coil is connected so as to provide an unlatching force when the entire system is reset by CR6 in the System Reset.

The relay CR15 is introduced in the System Reset circuit through energization by CR6 so as to insure that the capacitor in stage I is discharged with the reset of the entire system after either erasure of information or after misdialing.

As was described above in connection with FIGURE 2, SR2 and SR3 select the desired cross-point in the Cross-Point Switch and a shift to stage III of SR1 completes the circuit to the Cross-Point Switch so as to close that selected cross-point. This completion of the circuit to the Cross-Point Switch is illustrated by contact 5 in stage III of SR1 which energizes latched contact CR7 to thereby close and latch the circuit to the Cross-Point Switch. Again, as is the case of latched relay CR5, CR7 is unlatched by the closing of CR6 which supplies an unlatching force.

The above description of FIGURE 2 also points out that the closing of the contact in stage IV of SR1 completes the circuit to the readout drums 11. This is illustrated in detail by contact 2 in stage IV which is connected to off-delay timer A and then to each cross-point in the Cross-Point Switch. Timer A thereafter interrupts this circuit once the number is indicated and latched on the readout drum 11.

Erasing the numbers on the readout drums 11 was described in connection with FIGURE 2 by again selecting a particular cross-point on the Cross-Point Switch and then closing stage I of SR4, for example, by dialing 1. The Timer C connected to contact 3 in stage I energizes CR10 when stage I remains closed for a preselected period of time. The energization of CR10 closes Normally-Open contacts 1 and 2 therein with contact 1 being connected to the coil corresponding to the blank in each readout drum 11 and contact 2 completing the circuit to the preselected set of readout drums 11 via Timer A and the cross-point in the Cross-Point Switch.

Further details of the Cross-Point Switch and the readout drums 11 and the connection of the shift registers SR1–4 thereto is not necessary in view of the illustration of each in FIGURE 2. Therefore, the reader is referred to the description of the Cross-Point and readout drums 11 in connection with FIGURE 2. The overall operation of the system in FIGURES 3*a* and 3*b* is best shown in the above operational description of FIGURE 2 with reference to each detailed system of FIGURES 3*a* and 3*b* for internal operation thereof.

I claim:

1. In combination with a telephone system comprising telephone means with selector means which when operated generate grouped pulse signals and permit selection of a particular telephone in said system, an indicator system which permits the use of said telephone selector means to indicate said pulse signals in indicia form comprising:

(a) means which connect said telephone system to said indicator system in response to said selector means, (b) translation means comprising:

(1) first shift-module means responsive to said pulse signals, (2) first shift-register means controlled by said first shift-module means so as to shift with each pulse signal, (3) second shift-module means responsive to each group of pulsed signals, (4) second shift-register means controlled by said second shift-module means so as to shift and selectively route each group of pulsed signals to said first shift-register means, and (c) readout means connected to said translation means by which said pulsed signals are indicated in said indicia form.

2. In a communication system comprising:

(a) first communication means, selected means in said first communication means in said system for connecting said first communication means to other communication means in said system by means of a first set of signals from said selector means, (b) said first communication means including means for conveying selected signals from said selector means, said selected signals corresponding to a multiplicity of combinations of visual indicia, (c) indicating means connected to said system by said first set of signals from said selector means for receiving said selected signals including:

(1) storage means for at least some of said selected signals, (2) shift register means for selectively routing each of said selected signals to said storage means, and (3) means connected to said storage means and said shift register means for displaying any of said selected signals so selected at said selector means, said selected signals corresponding to visual indicia being displayed in a manner determined by said first set of signals.

3. In a communication system:

(a) selector means associated with communication means of said system for connecting other communication means of said system, (b) said communication means including means to convey grouped pulse signals of said selector means, said pulse signals corresponding to indicia, (c) indicating means connected to said system comprising, (1) first shift-register means which accommodate at least some of said pulse signals and shift with each pulse, (2) second shift-register means which selectively route each of said grouped pulse signals, (3) means connecting said first and second shift-register means so as to conduct at least some of said grouped pulse signals therebetween, and (4) means connected to said first and second shift-register means so as to evidence said indicia.

4. In a communication system:

(a) selector means associated with communication means of said system for connecting other communication means of said system, (b) said communication means including means to convey grouped pulse signals of said selector means, said pulse signals corresponding to indicia, (c) indicating means connected to said system comprising, (1) first shift-module means responsive to said pulse signals, (2) first shift-register means controlled by said first shift-module means so as to shift with each pulse signal, (3) second shift-module means responsive to each group of pulse signals, (4) second shift-register means controlled by said second shift-module means so as to shift and selectively route each group of pulse signals to said first shift-register means, and (5) means connected to said first and second shift-register means so as to evidence said indicia.

5. In combination with a telephone system comprising telephone means with selector means which when operated generate grouped pulse signals and permit selection of a particular telephone in said system, an indicator system which permits the use of said telephone selector means to indicate said pulse signals in indicia form comprising:

(a) means which connect said telephone system to said indicator system in response to said selector means, (b) translation means comprising, (1) a first shift-register means responsive to said pulse signals to thereby shift each pulse signal, (2) a second shift-register means responsive to each group of said pulsed signals so as to shift and selectively route each group of pulsed signals to said first shift-register means, and (c) readout means connected to said translation means by which said pulsed signals are indicated in said indicia form.

References Cited

UNITED STATES PATENTS

| | | | |
|---|---|---|---|
| 2,819,840 | 1/1958 | Huntley et al. | 328—37 |
| 2,851,534 | 9/1958 | Bray et al. | 179—18 |
| 3,113,204 | 12/1963 | O'Brien | 328—37 X |
| 2,913,526 | 11/1959 | Smits et al. | 179—5.5 |

KATHLEEN H. CLAFFY, *Primary Examiner.*

LAURENCE A. WRIGHT, *Assistant Examiner.*